UNITED STATES PATENT OFFICE.

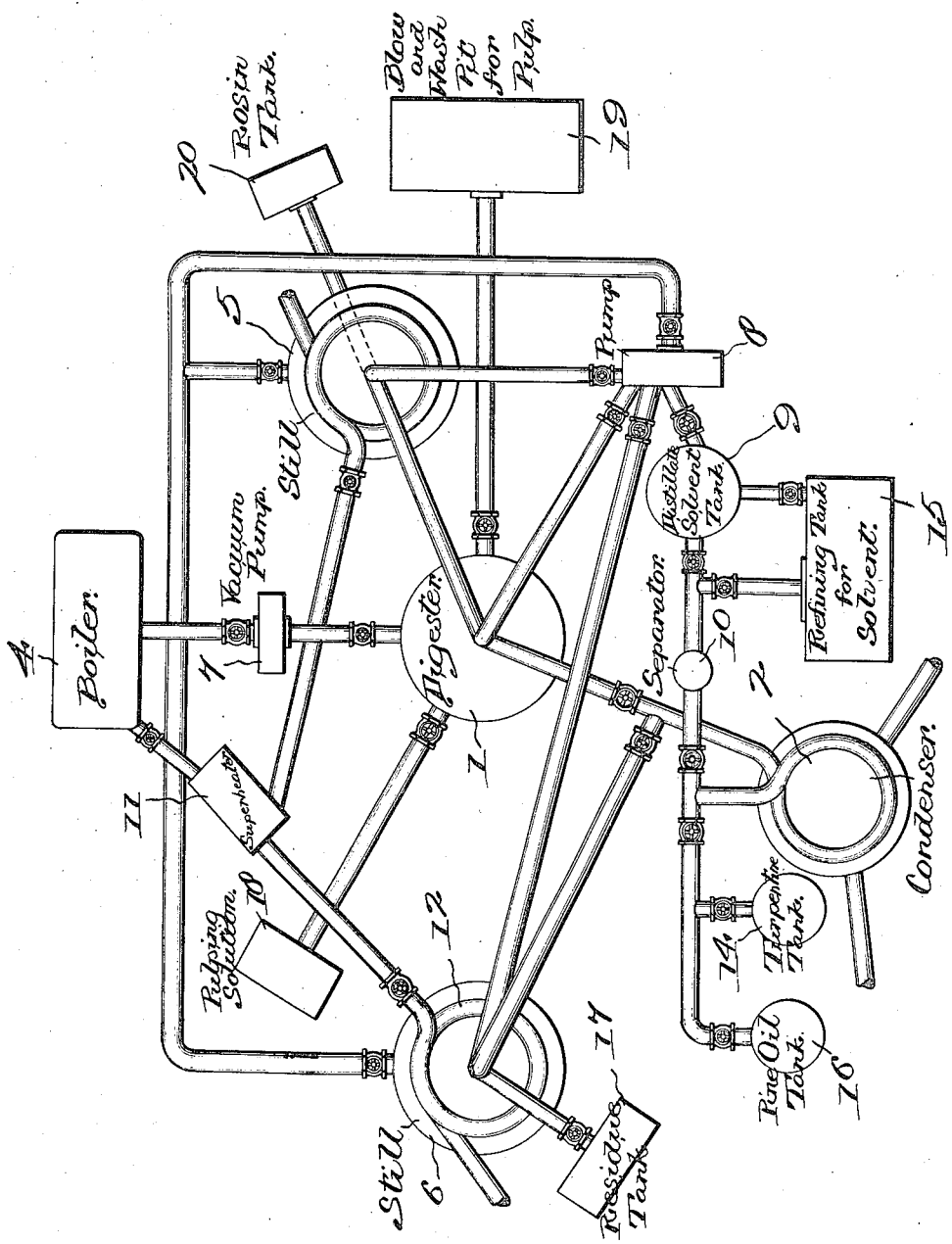

IRVING SPENCER CLOPE, OF MACON, GEORGIA, ASSIGNOR TO EMPIRE CHEMICAL COMPANY, OF ATLANTA, GEORGIA, A CORPORATION OF GEORGIA.

METHOD OF TREATING RESINOUS WOODS TO REMOVE THE SOLUBLE CONSTITUENTS THEREFROM.

1,144,171. Specification of Letters Patent. Patented June 22, 1915.

Application filed December 4, 1914. Serial No. 875,463.

*To all whom it may concern:*

Be it known that I, IRVING SPENCER CLOPE, a citizen of the United States, residing at Macon, in the county of Bibb and State of Georgia, have invented certain new and useful Improvements in Methods of Treating Resinous Woods to Remove the Soluble Constituents Therefrom; and I do hereby declare the following to be a full, clear, and exact description of the invention, such as will enable others skilled in the art to which it appertains to make and use the same.

My invention relates to a process for treating resinous woods to remove the soluble constituents thereof. The constituents of woods of the character indicated consist largely of resin, turpentine, and other intercellular matter and fiber. In treating coniferous woods, the main resinous extracts sought are rosin and turpentine. Various means for extracting these in condition, and of a grade to meet the market demand, have been attempted. One of these is the use of solvents, such as hydro-carbons. Rosin, which is one of the objects most largely sought, is, however, composed (in the main) of two acids, abietic and colophonic acid. These are not equally soluble in solvents of the kind just indicated. The abietic acid constituent goes into solution more readily than the other, and the result is that the more refractory colophonic constituent is apt to be left behind in the pores of the wood. This interferes very materially with the grade and character of the extracted product, and the rosin produced is distinctly below the grade of that obtained from the living trees by the process known as "boxing". What is true of rosin is true of turpentine as well, *i. e.* it is distinctly below first grade.

I have discovered a method of treating woods of the kind indicated, so that the objections indicated above are substantially removed, and in particular I am able by this process to remove the colophonic acid constituent of rosin as completely as the abietic acid, thereby obtaining a much more satisfactory product.

I have found in the use of solvents for the extraction of total resinous substances from coniferous woods that a solvent possessing a composition similar to the substances extracted is more efficient than solvents of the kind just mentioned because of the fact that most substances are readily extracted by solvents of composition similar to themselves, furthermore, the solvent and the substance extracted by the solvent are more readily separated by fractionation.

I have found that in distilling the complete extracted matter of that coniferous wood, known as long leaf yellow pine, there passes over at temperatures between 170° C. and 185° C. a distillate of a particular character. This distillate, representing a portion of the total volatile constituents of coniferous woods, is largely composed of terpenes and therefore has a composition allied to and of the same origin as that of the other separated constituents and thereby becomes a natural solvent. This intermediate product, which boils at from 170° C. to 185° C., has a specific gravity ranging from .875 to .880, and is composed principally of the constituents, limonene, dipentene, terpenene and cineol.

In carrying out my invention, I make use of apparatus shown in a diagrammatic plan in the accompanying drawing, in which:

1 is a digester into which the chips which are to be treated may be put; 2 is a condenser for the solvent; 15 a refining tank for the solvent; 10 a separator wherein the condensation products are separated from the solvent; 9 a distillate tank; 5 a still supplied from the distillate tank 9 by means of pump 8; 6 is another still supplied by means of the same pump.

17 represents a tank for the residue; 18 a tank for the pulping solution to be used after the chips have been extracted, and there are other details of apparatus which may be mentioned later.

In operation, the digester 1 is filled with chips of the wood undergoing treatment, and a vacuum, by means of the pump 7, is produced. Immediately following this the pump 8, operating on the solvent tank 9, conveys the solvent to the digester 1. This solvent in liquid form percolates through the chips and passes from the bottom of the digester to the condenser 2, then to the separator 10, and in turn to the distillate tank 9. The pump 8, again operating on distillate and solvent tank 9, conveys the distillate to still 5. The resinous substances, together with the solvent, are heated by means of a superheater coil 12, that is connected with the superheater 11. The solvent is conveyed to the digester 1, allowing the extracted resinous substances to remain in still 5. The vapor passing into the top of the digester gravitates through the chips, thereby extracting additional resinous substances at increased temperature. These vapors, together with the condensation products produced, pass through the condenser 2, and in turn separator 10, and distillate tank 9, and are then pumped, by means of pump 8, into still 5. This course of the solvent is continued for such time as is necessary to relieve the chips in the digester 1, of the resinous substances contained therein. When the digester 1 is filled principally with extracted chips and with the solvent, steam is directed into the bottom of the digester, thereby conveying the solvent and steam to the condenser 2, condensing both and allowing the water as it passes through the separator 10 to be discharged to a waste pipe, the distillate passing to the distillate tank 9. The distillate is then pumped from tank 9 by means of pump 8 to still 6, which is heated by superheater coil 12, supplied by superheated steam from superheater 11. The products of distillation are conveyed through the condenser and are divided as to their final destination, according to the temperature of the heated vapor, the first product over passing to turpentine tank 14, the second product passing to refining tank 15 for the solvent, the third product passing over to pine oil tank 16, and the final product remaining in still 6 is conveyed to resin tank 17. Pipes and controlling valves are provided as shown. The extracted chips in the digester 1 may be treated by a pulping solution conveyed from tank 18 to the chips, and a cook effected by steam, as is ordinarily practised. As soon as the chips become reduced to practically cellulose, through the neutralization of the lignin in combination with the chips, they are forced by steam into the blow and wash pit 19. The rosin is drawn from the bottom of still 5 to rosin tank 20. It will be seen, therefore, that by the use of this solvent, which I have before indicated, in a plant of the character shown, I am enabled, without loss of solvent and without waste, to recover from the chips in the digester, their entire contents of resinous substances and cellulose.

Having thus described my invention, what I claim as new and desire to secure by Letters Patent of the United States is:

1. The method of treating resinous woods to remove the soluble constituents therefrom, which consists in subjecting chips of such wood to treatment in a digester with that distillate from coniferous woods which passes over at from 170° C. to 185° C.

2. The method of treating resinous woods to remove the resinous constitutents therefrom, which consists in subjecting chips of such wood to treatment in a digester with an extractive agent, which consists mainly of limonene, dipentene, terpenene and cineol.

3. The method of treating resinous woods to remove the soluble constitutents therefrom, which consists in subjecting chips of such wood to treatment in a digester with that distillate from coniferous woods which passes over at from 170° C. to 185° C., and having a specific gravity of from .875 to .880 at 15° C.

4. The method of treating resinous woods to remove their soluble constitutents therefrom, which consists in subjecting the chips of such wood to treatment in a vacuum with a solvent consisting of that distillate from such woods which passes over at from 170° C. to 185° C., in the form of vapor, permitting said vapor to condense among the chips, collecting the condensed vapor and dissolved substances, separating out the substances from the wood by distillation, and re-circulating the solvent.

In testimony whereof, I affix my signature, in presence of two witnesses.

IRVING SPENCER CLOPE.

Witnesses:
J. W. MARKHAM,
C. T. ALBRITTON.